PHONOGRAPH STYLUS ASSEMBLY

Filed Oct. 13, 1955 2 Sheets-Sheet 1

INVENTOR:
ROY DALLY,
BY Donald N. Timbie
HIS ATTORNEY.

Jan. 21, 1958 R. DALLY 2,820,853

PHONOGRAPH STYLUS ASSEMBLY

Filed Oct. 13, 1955 2 Sheets-Sheet 2

INVENTOR:
ROY DALLY,
BY Donald K. Tinlie
HIS ATTORNEY.

2,820,853
Patented Jan. 21, 1958

2,820,853

PHONOGRAPH STYLUS ASSEMBLY

Roy Dally, Liverpool, N. Y., assignor to General Electric Company, a corporation of New York Application October 13, 1955, Serial No. 540,219
9 Claims. (Cl. 179—100.41)

This invention relates generally to transducers of the vibrating reed type, and more specifically to a novel stylus support for use in phonograph pickups, which support may be easily removed from the pickup head and replaced and/or a new support inserted in its stead.

It is a common practice to provide styli assemblies in the phonograph pickup art, wherein the styli and/or their supporting structures may be replaced as the styli wear out or fail for one reason or another. One of the more common constructions involves the use of a set screw and a chuck in which the stylus is retained when the set screw is tightened. Such arrangements are objectionable, inasmuch as a set screw and chuck construction is of significant weight. In the usage of pickup heads where high fidelity and long stylus and record life are important, such weights are in excess of those found to be desirable.

Therefore, it is an object of this invention to provide an improved phonograph stylus supporting means which has a minimum weight and permits replacement of the stylus and its related support.

Other types of replaceable styli may involve the use of some kind of frictional retaining means. These retaining means may require the use of a special tool or a high degree of skill on the part of the person making the stylus change. In the so-called "high-fidelity" pickup head, these requirements may be such that the instrument has to be returned to its maker or a skilled serviceman in order that the job may be done properly.

Accordingly, it is another object of this invention to provide an improved stylus support which permits changing of the stylus and its support by an unskilled person and requires no special tools and still accurately positions the stylus in relation to the pickup head.

A further object of this invention is to provide improved phonograph styli supports for use in dual-play pickup heads which are individually replaceable whereby only one stylus need be replaced at a time.

A still further object of this invention is to provide an improved phonograph stylus support which permits replacement of the stylus and a portion of the support and yet does not require that excessive supporting structure be replaced.

Briefly, the objects of my invention are achieved by providing a post to extend through a phonograph pickup head which may, if desired, be retained therein by a spring-pressed retaining element. On the bottom of the post, there is provided a channel member capable of receiving styli supports either at one or both ends thereof. Slidably mounted in the ends of the channel, I provide a base or bases on which the stylus-carrying arm is mounted. Each base is provided with a pair of winglike structures which are coextensive with the base and frictionally engage a portion of the channel to retain the base therein. The bases or some other portion of the styli supporting assembly are provided with a suitable stop means to limit the amount of insertion into the channel member and accurately position the support. I also provide a means whereby the styli-carrying arm and the base-retaining structure may be suitably damped to prevent the development of mechanical resonances, thus retaining or increasing the fidelity of the pickup head.

The features of my invention which I believe to be novel are set forth with particularity in the appended claims. My invention, itself, however, both as to its organization and method of operation, together with further objects and advantages thereof, may best be understood by reference to the following description taken in connection with the accompanying drawings in which:

Figure 1:
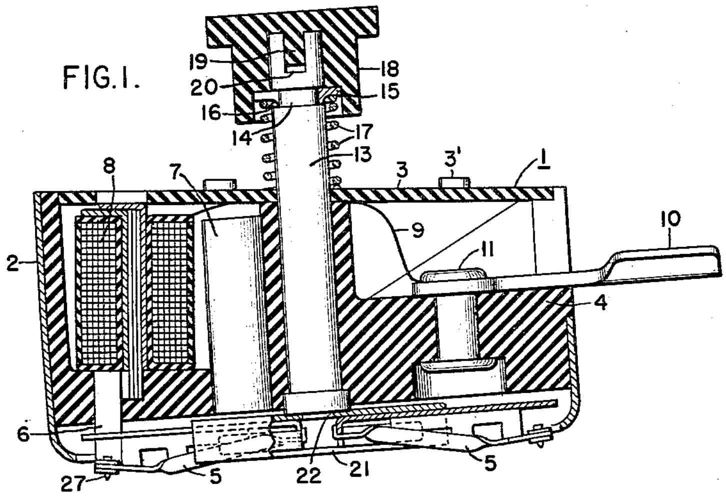
Figure 1 is a sectional side view of a phonograph pickup wherein there is mounted a first embodiment of my invention.
Figure 2:
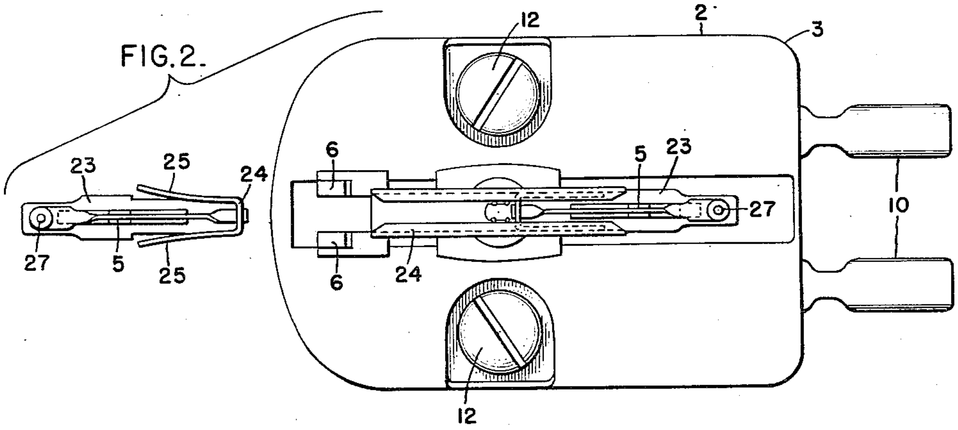
Figure 2 is an exploded bottom view of the pickup and the first embodiment of my invention shown in Figure 1.

In Figures 1 and 2 of the drawings, I have illustrated my novel replaceable phonograph stylus support assembly mounted in a holder of a phonograph pickup head of the type illustrated in the patent to Miner et al., U. S. Patent 2,554,209, issued May 21, 1951, and assigned to the same assignee as the present invention. The pickup head is designated generally by reference numeral 1 and includes a case or container 2 and a cover 3 which may be formed of any suitable material such as a plastic. The cover 3 closes the top of the container of the case and is retained thereon by the tabs 3' that are formed from the cover 2 and are bent over. It is to be understood that the showing in Figures 1 and 2 is for purposes of illustration only, as I contemplate that my invention may be used in pickup heads which differ both in structure and the manner in which the electrical signals are developed. Mounted in the case 2, there is provided a body 4 of insulating material which provides the support and positioning means for the electrical signal and generating components and other elements of the pickup head. A stylus-supporting arm or reed 5, which may be formed of a magnetic material, is mounted on my support and functions to vary the relative amount of flux in an air gap between two pole pieces 6. The flux is provided by the permanent magnet 7 which is superimposed over the arm 5. A pair of coils, only one of which, 8, is shown as supported in the case and have associated therewith the pole pieces 6 which depend below the surface of the case. The stylus-carrying arm is positioned between the depending pole pieces and by virtue of its movement therein, varies the relative air gaps between the pole pieces 6 to cause electrical signals to be generated in the coils 7. Conductors 9 connect the coils to terminals 10 which are secured to the body 4 by means of rivets 11 or other suitable means. The pickup head is adapted to be mounted in the arm of a phonograph device by means of the screws 12 or any other means found convenient and desirable. The pickup head structure and the electrical signal and magnetic circuits are described in greater detail in the patent to Miner et al., referred to above. My invention is not directed to the details of these elements which are shown for purposes of illustration only.

Figure 4:
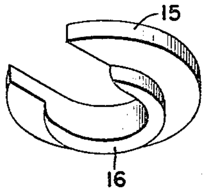
Figure 4 is a perspective view of a split retaining ring used in my invention.

In the embodiment of my invention illustrated in Figure 1, I provide a stylus support assembly holder that includes a post 13 extending through a passage provided in the body 4 of the pickup head 1. The post extends above the top of the pickup head and is provided at its upper end with a reduced portion 14 which receives a C washer 15 more clearly illustrated in Figure 4. This C washer is provided with a thickened portion 16, on one side thereof, and is adapted to be mounted in the reduced portion 14 of the post 13. A spring 17 surrounds the thickened portion 16 and extends between it and the cover 3 of the case 2, so as to exert an upward pressure on the post 13. A cap, or knob 18, is mounted on the upper end of the post by means of a tongue 19, frictionally engaged in a slot 20. The cap 18 is for the purpose of rotating the stylus support assembly in a manner to be brought out in greater detail hereinafter. This construction retains the post 13 in the pickup head and the post 13 may be removed by first removing the cap 19 and the C washer 15. If desired, alternative methods of retaining the post 13 may be used, as for example, means frictionally gripping its sides.

In this embodiment of my invention the principal part of the stylus support assembly holder comprises a channel member 21 provided at the bottom of the post 13 that extends transversely of the longitudinal axis of the post and that is secured thereto at the web 22. As shown in Figures 1 and 2, the channel member 21 extends on either side of the post 12. Such a construction is for the purpose of permitting the use of my stylus support in the so-called "triple-play" pickup head so that more than one size of a record groove may be accommodated. It is to be understood that if it is desired to use my invention in a pickup head capable of engaging only one size of a record groove, the channel 21 need only extend on one side of the post 13 to carry the stylus in the manner to be described hereinafter.

Figure 3:
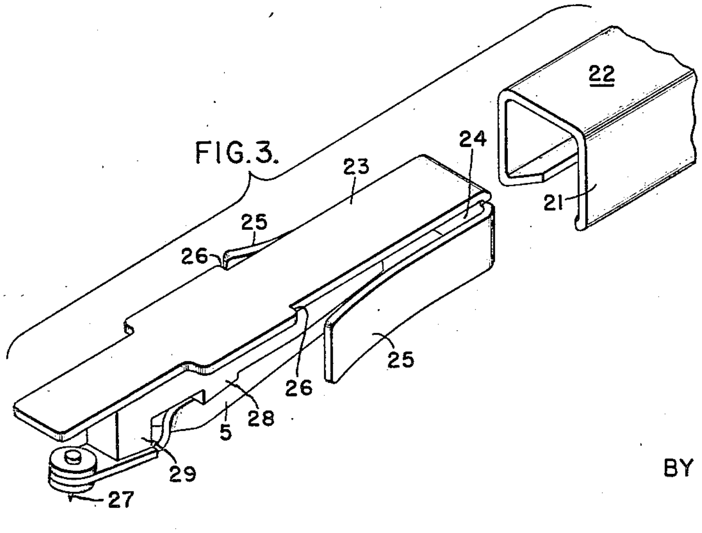
Figure 3 is an exploded perspective view of the form of my invention shown in Figure 1.

Attention is now directed to Figure 3 which illustrates in detail one of the replaceable stylus assemblies adapted to be slidably mounted in the ends of the channel member 21. Each of these stylus support assemblies comprises an elongated base structure 23 which has one end formed as a bent tab 24. Extending from the bent end or tab 24 are a pair of wings 25, which are formed so as to extend in the same direction as the base 23 and in a plane at substantially right angles thereto. The wings 25 are spaced slightly from the base 23 and flare slightly outwardly and upwardly therefrom at their free ends. The base 23 is provided with stop means constituted by shoulders 26 forward of the free ends of the wings 25 which shoulders engage with the ends of the channel 21 to limit the movement of the base therein. Secured to the tab 24 in the illustrated embodiments of my invention there is provided the cantilevered arm 5, which carries a stylus 27 at its free end. The stylus arm 5 illustrated, is that shown in the patent to Miner et al., referred to above. It is to be understood, however, that this is shown by way of example only, as the supporting structure may be used with any type of stylus-carrying arm desired, such as ones with a single quarter twist or a straight flat reed. Positioned between the base 23 and stylus arm 5, is a damping block such as that shown at 28, which engages the stylus arm at the spaced points 29. This showing of damping material is likewise by way of illustration only, as other arrangements may be used.

In using this device, the post 13 is positioned in the pickup head and retained therein by the action of the C washer 15 and spring 17. The bases 23 each carrying their respective stylus supporting arms 5, are slid into opposite ends of the channel 21. Upon the insertion of the base 23 into the channel 21, the wings 25, which normally flare outwardly and slightly up, will be depressed downwardly and inwardly so that their extreme free edges frictionally engage the inner side and upper walls respectively of the channel 21, to retain the base therein in its proper longitudinal position. The downward depression of the wings 25 firmly seats the base 23 against the web 22 of the channel 21 and also helps to retain the base in its proper longitudinal position. Such a firm seating is necessary in order to prevent movement of the base 23 and the development of undesired resonances. The amount of inward movement of the base will be determined by the setting of the stops 26.

Should it be desired to replace one or both of the styli, the cap 18 is pushed to depress the post 13 and thereby the channel 21 below the level of the pickup head. In this position, either one of the styli supports may be engaged by hand and pulled out of the channel 21 and new ones may be inserted. When the styli arms 5 are mounted integrally with a supporting post, as in previous structures, it is necessary to remove and replace the entire post and styli assembly, whereas, in this device the post 13 need not be removed from the pickup. Thus, a minimum of structure is required to be replaced. Further, no special tools and skills are necessary, so that replacement can be affected by the user at a minimum of expense and time.

In order to interchange the positions of the styli to selectively reproduce records having different width grooves, it is merely necessary to depress the cap 18 and rotate the post 13 in a manner similar to that described in the patent to Miner et al., referred to above.

Also, it may be seen that the arrangement permits a device to be used in those pickup heads currently in use, such as shown in the Miner et al. patent. All that is required is that the user purchase the inexpensive post and channel assembly, together with the sliding bases supporting the styli arm. Subsequent replacement of the styli involves only the purchase of the base 23 and its related structure.

The replacement assembly I provide, may be used with minor changes in a large number of pickup heads. Such a change may involve the use of different means to retain the post 13 in the pickup head. The dimensioning and detailed features of my replaceable stylus assembly are, of course, limited by the pickup head structure for which it is intended and the desire to retain or enhance the fidelity and other qualities of the pickup head. Another advantage is that the supporting structure for the stylus arm 5 consists of only the base 23 and the retaining wings 25, thus a minimum of space is occupied adjacent the stylus arm, so that space for the damping blocks is available as needed. A further advantage is that the user can insert styli formed of a material and dimensioned to suit his needs as determined by the record and the results desired.

Figures 5, 6:
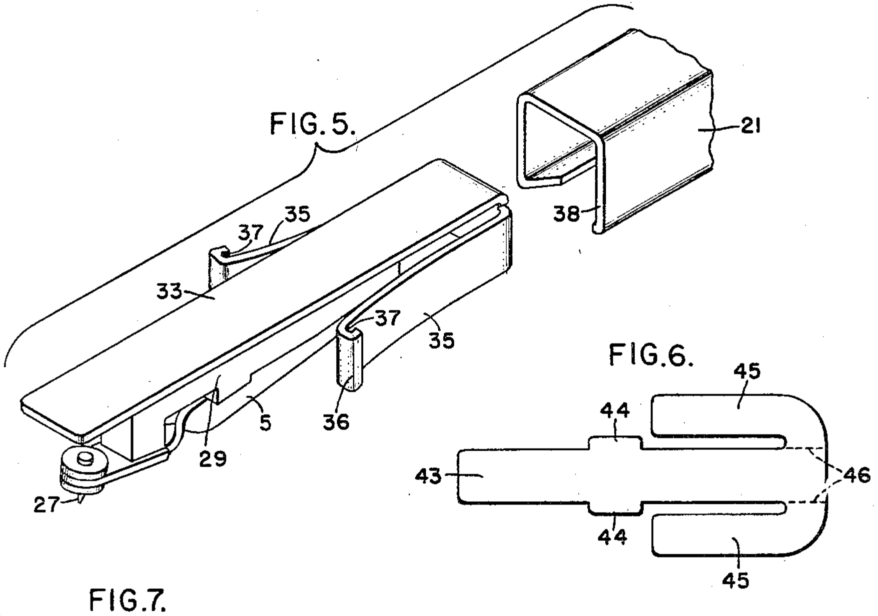
Figure 5 is an exploded perspective view illustrating another embodiment of my invention.
Figure 6 is a plan view of an alternative construction of a portion of my invention prior to completion of its fabrication and assembly.

In Figure 5, I show a second embodiment of my invention. In this figure and subsequent figures, parts of the embodiments which correspond to parts of my first embodiment are given the same reference numerals. The channel 21, in this case, receives a base 33 which has a pair of wings 35 extending from one end thereof. The wings are disposed on each side of the base and flare slightly outwardly and upwardly. Each wing is provided at its end with a bent over portion 36, which forms a groove 37. As the base 33 is inserted into the channel member 21, the wings 35 are sprung downwardly and inwardly, as before, and insertion will be continued until the grooves 37 engage the channel ends 38. The grooves 37 may be dimensioned so as to engage the ends 38 of the channel with a frictional grip to thereby aid in retaining the base 33 in the channel 21. The bent over ends 36, in this instance, act as both the support retaining means and the stop means, thus eliminating the necessity for shoulders on the base 33.

Figure 7:
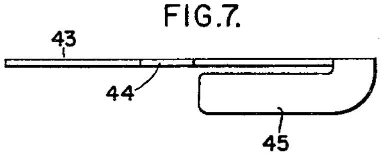
Figure 7 is a side view of the form of my invention illustrated in Figure 6, after a fabrication step.

In the forms of my invention described above, the styli supports formed from the bases 23 and 33 and the wings 25 and 35, respectively, are formed out of a substantially T-shaped member and in constructing the support, the end of the T is bent up and the arms of the T are bent forward and flared outwardly to give the desired structure of the base and wings. In Figures 6 and 7, I disclose another form the stylus support may take. In this configuration, a substantially "anchor" shaped member is punched out of a flat thin metallic material as shown in Figure 6. The support in this instance comprises a flat, elongated base 43, provided with the shoulders 44 to limit its insertion into the channel member. In this instance, the wings 45 are formed by bending them along the dotted lines 46 to present the configuration shown in Figure 7. The arm 5 and damping blocks are then mounted on the base to finish the construction of the replaceable element. If desired, the wings could be formed as elements separate from the base and joined by any suitable means thereto.

Figure 8:
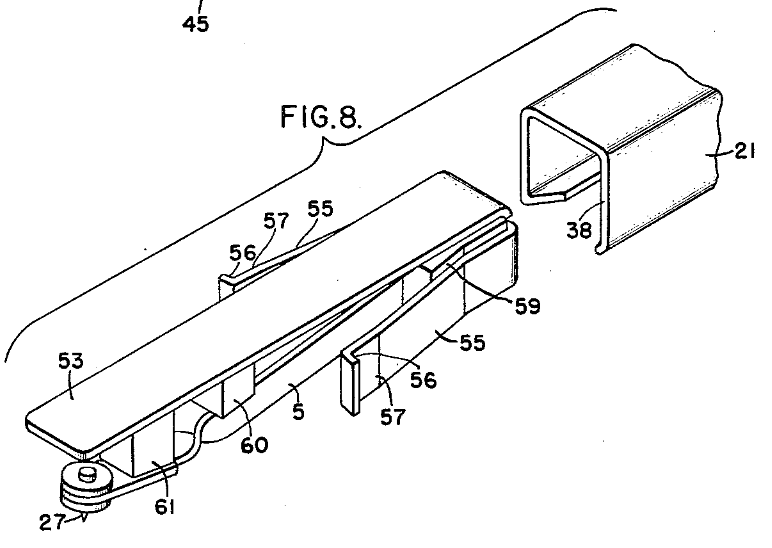
Figure 8 is an exploded perspective view of still another embodiment in which my invention may appear.
Figure 9:
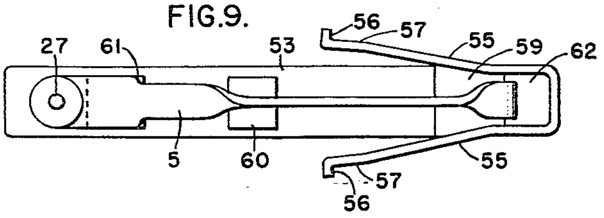
Figure 9 is a bottom view of the embodiment of my invention illustrated in Figure 8.

In Figures 8 and 9, I disclose still another embodiment of my invention. In this embodiment, the base 53 is provided with the slightly outwardly and upwardly flaring wings 55. Each of the wings is provided at its outer extremity with a bent over tab 56 at the end of a straight portion to engage the channel end 38 and function as the stop means or limiting device. The flared portions of the wings 55 terminate in the sharp edges 57, which function as the channel wall gripping means when the wings are depressed inwardly and downwardly inside the channel 24, as the base is inserted in the channel 21.

In order to prevent undesired resonances within the wings of the various structures, the width of the appropriate damping block or blocks is sufficient to engage the wings. Although, this particular feature is disclosed in conjunction with the embodiment in Figures 8 and 9, it is readily understood that it may be used with the other forms of the invention described above. A damping block system consisting of a damping block 59 is disposed between the base 53 and the stylus carrying arm 5. The damping block 59 is mounted between the arm 5, adjacent to the fixed end thereof, and the base 53. As illustrated, this block extends on both sides of a twist in the arm 5, however, it may be dimensioned to engage the arm either on one or the other sides of the twist. In addition, it is of such a width as to engage the wings 55 to prevent the development of any resonances therein. A second damping block 60 is disposed forward of the damping block 59 and engages the stylus carrying arm 5 at a spaced intermediate point. A third damping block 61 may be used on the very forward part of the arm 5, on a flat portion thereof.

The stylus-carrying arm 5, in this form of my invention, may be secured to the base 53 by depositing solder or other suitable securing means 62 adjacent one end thereof. It is understood, however, that the arrangement by which stylus-carrying arm 5 is mounted on the base is not limited to specific arrangements shown in the figures. It is to be further understood that my stylus supporting structure may be used with stylus arms having configurations differing from that disclosed in the drawings.

While my invention has been described by reference to particular embodiments thereof, it will be understood that numerous modifications may be made by those skilled in the art without departing from the invention. I, therefore, aim in the appended claims to cover all such equivalent variations as come within the true spirit and scope of my invention.

What I claim as new and desire to secure by Letters Patent of the United States is:

1. A stylus support assembly for a phonograph comprising in combination, an elongated base formed from a non-magnetic material, a flexible arm of magnetic material, means mounting one end of said arm adjacent one end of said base, said arm extending substantially parallel to said base toward the other end of said base and having a free end, a record engaging stylus positioned near the free end of said arm, a pair of wings extending from said one end of said base, said wings being disposed on the same side of said base as said arm and flaring outwardly and upwardly from the plane thereof, a first damping block engaging said arm, said base and said wings, and a second damping block positioned adjacent the free end of said arm for engaging said arm and the other end of said base.

2. A stylus support assembly for a phonograph pick-up comprising in combination an elongated base formed from a non-magnetic material, a flexible arm of magnetic material, means mounting one end of said arm adjacent one end of said base so that the arm extends along side and substantially parallel to the longitudinal axis of said base, a record engaging stylus positioned on the free end of said arm, a pair of wings extending from opposite sides of the end of said base on which said arm is mounted, said wings flaring outwardly, first damping means mounted between said wings, said arm and said base whereby said damping means engages said wings to prevent the development of undesired resonances therein, and second damping means mounted between said arm and said base adjacent the free end of said arm.

3. A stylus support assembly comprising an elongated base of non-magnetic material, said base having a tab at one end extending substantially perpendicular to said base, a flexible cantilever arm of magnetic material mounted on said tab to extend along side and substantially parallel to said base, and at least one expansible wing extending from said tab to flare outwardly from said base in a direction perpendicular to the plane defined by said arm and the longitudinal axis of said base.

4. The combination set forth in claim 1 further characterized by damping means mounted between said base, said arm and said wing.

5. A stylus support assembly comprising an elongated base of non-magnetic material, said base having a tab at one end extending substantially perpendicular to said base, a flexible cantilever arm of magnetic material mounted on said tab to extend along side and substantially parallel to said base, and a pair of resilient wings extending from opposite sides of said tab and flaring outwardly from said base in a direction perpendicular to the plane defined by said arm and the longitudinal axis of said base.

6. The combination set forth in claim 5 further characterized by damping means mounted between said base, said arm and said wings.

7. In a magnetic phonograph pick-up of the variable reluctance type including a pair of spaced-apart pole pieces, the combination comprising an open-ended channel member mounted on the bottom of said pick-up and extending in the direction of said pole pieces, at least one elongated base of non-magnetic material slidably and removably mounted in said channel member, at least one resilient wing flaring outwardly from the sides of one end of said base for frictionally retaining said base in said channel member, a flexible cantilever arm of magnetic material mounted on the same end of said base as said outwardly flaring wing to extend along side and in substantially parallel relationship with said base, the free end of said cantilever arm being disposed between said pole pieces, a record engaging stylus mounted on the free end of said cantilever arm, first damping means mounted between said base, said arm and said wing to prevent the development of resonances in said wing, and second damping means mounted between said arm and said base adjacent the free end of said arm.

8. In a magnetic phonograph pick-up of the variable magnetic reluctance type having a pair of spaced-apart pole pieces, the combination comprising an open-ended channel member pivotally mounted on the bottom of the pick-up and extending transversely in two directions from the pivotal axis thereof, a pair of bases formed from non-magnetic material, one base being slidably mounted in each end of said channel member, each base having a tab at one end thereof extending substantially perpendicular to the base, a flexible cantilever arm of magnetic material mounted on the tab on each base to extend along side and in substantially parallel relationship with its respective base, a pair of resilient wings extending from opposite sides of the tab on each base and flaring outwardly from the base, the free end of each cantilever arm being disposed between the pole pieces, and a record engaging stylus mounted on the free end of each cantilever arm.

9. The magnetic phonograph pick-up set forth in claim 8 further characterized by damping means mounted between each base and the respective cantilever arm and wings thereof.

References Cited in the file of this patent

UNITED STATES PATENTS

| | | |
|---|---|---|
| 2,475,608 | Gasparich | July 12, 1949 |
| 2,554,209 | Miner et al. | May 22, 1951 |
| 2,622,156 | Baker | Dec. 16, 1952 |
| 2,742,295 | Frederick | Apr. 17, 1956 |
| 2,742,530 | Mayer | Apr. 17, 1956 |
| 2,759,734 | Velepec | Aug. 21, 1956 |